Feb. 27, 1968   C. HILL ET AL   3,370,476
CAMSHAFT DRIVE TOOTHED BELT AUTOMATIC TENSIONER
Filed Feb. 11, 1966   2 Sheets-Sheet 2

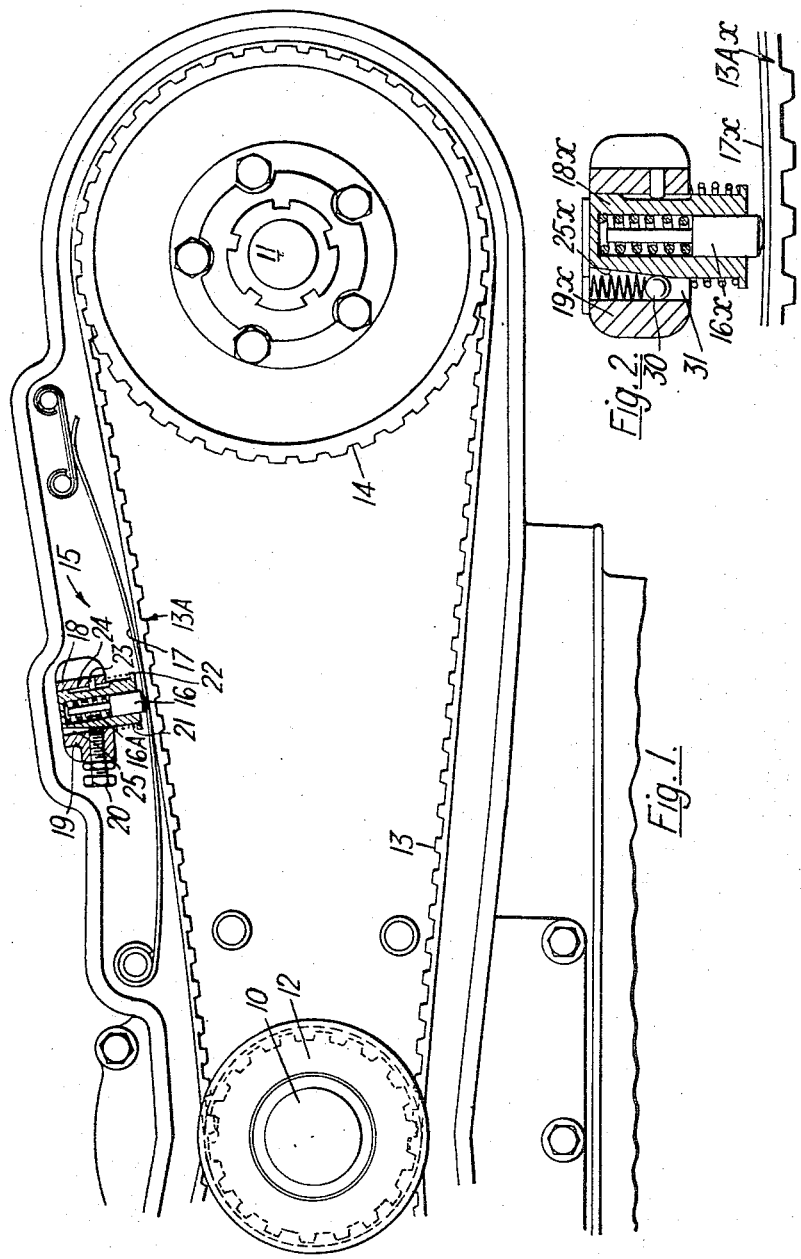

Inventors
CLAUDE HILL & OSWALD WEBB
By
Mason, Fenwick & Lawrence
Attorneys

United States Patent Office 3,370,476
Patented Feb. 27, 1968

3,370,476
CAMSHAFT DRIVE TOOTHED BELT
AUTOMATIC TENSIONER
Claude Hill, Kenilworth, and Oswald Webb, Whitley, Coventry, England, assignors to Harry Ferguson Research Limited, Abbotswood, Stow-on-the-Wold, Great Britain
Filed Feb. 11, 1966, Ser. No. 526,797
Claims priority, application Great Britain, Feb. 25, 1965, 8,081/65
9 Claims. (Cl. 74—242.11)

ABSTRACT OF THE DISCLOSURE

A device for automatically limiting to a predetermined amount deflection of a belt contacting member tensioning the timing belt in an internal combustion engine having a thimble carrying a plunger slidable therein and projecting therefrom, a housing in which the thimble is slidable, a relatively stiff compression spring repressably holding the plunger away from the closed end of the thimble by a predetermined amount, a relatively weak compression spring urging the thimble out of the housing so as to bring the head of the plunger into contact with the back of the belt contacting member, a one way locking means for preventing movement of the thimble away from the belt contacting member.

This invention relates to tensioning apparatus for a belt or chain adapted for use with a belt or chain drive. Such tensioning apparatus will be referred to hereinafter and in the claims simply as a "belt tensioner." The invention is especially but not exclusively applicable to a belt tensioner for use with a timing belt of an internal combustion engine.

Where a belt is used to transmit drive between, for example, two sprockets, a belt tensioner may be required to preserve a desired tension on the slack side of the belt. It has been proposed to use belt tensioners which are spring urged to apply the required tension and which can be deflected by the belt to accommodate slight variations in wheel centre distance caused, for example, by temperature changes; additionally, in such previously proposed belt tensioners, the slack side of the belt may become taut and tangential to the associated sprockets in the event of the direction of drive being reversed.

If the direction of drive is reversed, there is a danger of loss in mesh between the belt and the sprockets due to the slack side of the belt being permitted to become tangential to the wheels with the consequent slackening of the opposite side of the belt.

It is an object of the present invention to provide a belt tensioner in which the above danger is obviated or mitigated.

According to the present invention there is provided a belt tensioner including a contact member adapted to engage the slack side of an endless flexible member trained round and in mesh with spaced sprockets, and a deflection limiting device having an intermediate member carrying a plunger slidable therein and projecting therefrom, a housing in which said intermediate member is slidable, stop means on said intermediate member to limit the axial movement of the plunger relative to said intermediate member, first spring means for depressably holding said plunger off said stop means by a predetermined amount, second spring means for urging said intermediate member towards the side of said contact member remote from said endless flexible member so as to cause the projecting end of said plunger to contact said remote side of the contact member, said first spring means being of greater stiffness than said second spring means, and locking means operable to prevent axial movement of said intermediate member relative to said housing in a direction away from said contact member.

Further, according to the present invention, there is provided for use with a contact member adapted to tension the timing belt of an internal combustion engine, a deflection limiting device having an intermediate member carrying a plunger slidable therein and projecting therefrom, a housing in which said intermediate member is slidable, stop means on said intermediate member to limit the axial movement of the plunger relative to said intermediate member, first spring means for depressably holding said plunger off said stop means by a predetermined amount, second spring means for urging said intermediate member towards the side of said contact member remote from said timing belt so as to cause the projecting end of said plunger to contact said remote side of the contact member, said first spring means being of greater stiffness than said second spring means, and locking means operable to prevent axial movement of said intermediate member relative to said housing in a direction away from said contact member.

Embodiments of the invention will now be described, by way of example, with reference to the drawings, in which:

FIG. 1 shows an end elevation, partly in section, of a part of an internal combustion engine showing the timing belt and a belt tensioner according to the invention.

FIG. 2 shows a sectional end elevation of a modified deflection limiting device and part of a blade tensioner and timing belt.

Figure 3:
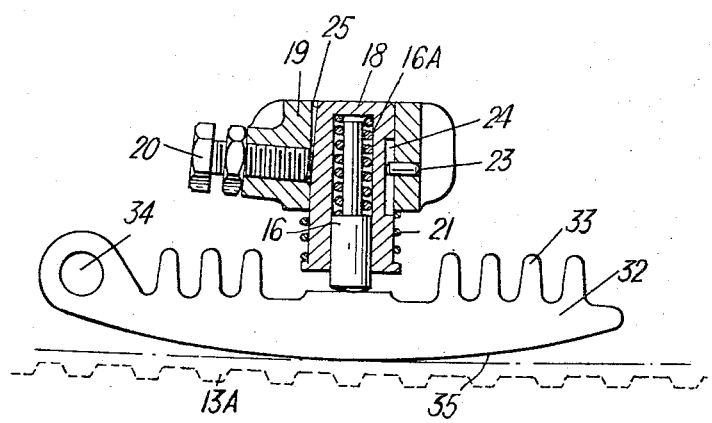
FIG. 3 shows a sectional end elevation of a modification of a belt tensioner according to the invention.

Referring to the drawings, an internal combustion engine having a crankshaft 10 drives a timing gear shaft 11 through a first sprocket 12 on the crankshaft 10, an internally toothed belt 13, and a second sprocket 14 on the timing gear shaft 11 (FIG. 1).

The normally slack side of the belt 13 is indicated by 13A and is tensioned by a belt tensioner 15 comprising a contact member in the form of a blade spring 17 anchored at one end to the engine crankcase and bowed to tension the belt 13A, and a deflection limiting device in which an intermediate member in the form of a thimble 18 is slidable in a housing 19 which is fixed to the engine crankcase. The thimble 18 has a plunger 16 slidable therein and is urged towards the blade spring 17 by a compression spring 21. The stem of the plunger 16 is held off the closed end of the thimble 18 by a compression spring 16A and the head of the plunger 16 contacts the back of the blade spring 17 under the influence of the spring 21. The spring 16A is stiffer than the spring 21. The length of the stem of the plunger 16 and the length of the spring 16A are adapted to allow the plunger 16 to be depressed into the thimble 18 by only a predetermined amount. The thimble 18 can be locked relative to the housing 19 by a pin or screw 20 which bears on a ramp or tapered face 25 formed on the thimble 18. The angle of the taper is less than the angle of friction so that tightening of screw 20 will not cause the thimble to be pushed out of the housing 19. This locking arrangement is positive against movement of the thimble 18 away from the blade spring 17. The tapered face 25 is maintained in alignment with the screw 20 by means of a pin 23 inserted through the wall of the fixed housing 19 and locating a slot 24 formed on the thimble 18 so as to allow axial movement of the thimble 18 (FIG. 1).

On assembly, after the blade spring 17 has been fitted to tension the belt 13A, the thimble 18, carrying the plunger 16 and the spring 16A, is allowed to move towards the back of the blade spring 17 under the influence of spring 21 until the head of the plunger 16 contacts the back of the blade spring 17. The stiffer spring 16A is not compressed, and the stem of the plunger 16 is held off the closed end of the thimble 18 by the predetermined amount. The screw 20 is now turned to bear on the tapered face 25 on the thimble 18. The screw 20 is secured by a lock nut or any other suitable means. The assembly is now completed and the blade spring 17 can not be deflected beyond the predetermined amount which is less than the depression of the belt 13A below the common tangent of the pulleys. That is to say that the plunger 16 cannot be depressed into the thimble 18 sufficiently to allow the slack side of the belt 13A to become tangential to the toothed wheels 12 and 14.

In FIG. 2, parts already described with reference to FIG. 1 have the same reference numerals with the addition of the suffix X. In this embodiment, the essential difference lies in the means for locking the thimble 18X relative to the fixed housing 19X in the direction away from the blade spring 17. A slot 31 is formed in the housing 19X and a spring loaded roller 30 is located partly in the slot 31 and partly on the tapered face 25X.

On assembly, the procedure already described is adopted with the exception that the use of the screw 20 of FIG. 1 is eliminated. Locking of the thimble 18X relative to the housing 19X in the direction away from the blade spring 17 is achieved automatically be a wedging action between the tapered face 25X and the slot 31 through the roller 30.

Modifications of the above described belt tensioners may, of course, be made without departing from the spirit of the invention. In one modification, the blade spring is replaced by a rigid contact member having a wear resistant and/or low friction surface in contact with the belt, and the springs 16A and 21 simply increased in stiffness so that the tensioning effort is derived from spring 21.

An example of this modification is illustrated in FIG. 3, in which the numerals of FIG. 1 have been used to indicate identical parts. In this example, the belt 13A is contacted by a rigid slipper 32 which is adapted to pivot about a pin 34 anchored to the engine crankcase (not shown). The slipper 32 has a cylindrical face 35 which may have wear resistant properties, and tensions the belt 13A under the influence of spring 21, which acts through the thimble 18, the spring 16A and the plunger 16.

The slipper 32 in this example is provided with fins 33 to assist the dissipation of heat generated by the movement of the belt 13A against the surface 35.

In further modifications, the slipper 32 may not be completely rigid, but may exhibit the properties, for example, of a synthetic resinous material such as "nylon." Moreover, the pin 34 may be dispensed with, and the slipper or contact member located by having flanges engaging the edges of the belt and a socket engaging the plunger 16.

We claim:
1. A belt tensioner including a contact member adapted to engage the slack side of an endless flexible member trained round and in mesh with spaced sprockets, and a deflection limiting device having an intermediate member carrying a plunger slidable therein and projecting therefrom, a housing in which said intermediate member is slidable, stop means on said intermediate member to limit the axial movement of the plunger relative to said intermediate member, first spring means for depressably holding said plunger off said stop means by a predetermined amount, second spring means for urging said intermediate member towards the side of said contact member remote from said endless flexible member so as to cause the projecting end of said plunger to contact said remote side of the contact member, said first spring means being of greater stiffness than said second spring means, and locking means operable to prevent axial movement of said intermediate member relative to said housing in a direction away from said contact member.

2. A belt tensioner according to claim 1, in which said intermediate member is in the form of a tube closed at one end, said closed end forming said stop means.

3. A belt tensioner according to claim 1, in which said first and second spring means are compression springs.

4. A belt tensioner according to claim 1, in which said contact member is a rigid slipper.

5. A belt tensioner according to claim 1, in which said contact member is provided with fins.

6. A belt tensioner according to claim 1, in which said contact member is a blade spring.

7. A belt tensioner according to claim 1, wherein the said locking means comprises means defining a ramp on the external wall of the intermediate member and extending longitudinally thereof, means defining an aperture in the wall of the housing opposite the ramp, and a pin secured in the aperture and extending into the housing and having an end face coacting with the ramp.

8. A belt tensioner according to claim 1, wherein the said locking means includes means defining a ramp on the external wall of the intermediate member and extending longitudinally thereof, means defining a slot in the internal wall of the housing opposite the ramp, and a roller engaging the bottom of the slot and the ramp.

9. For use with a contact member adapted to tension the timing belt of an internal combustion engine, a deflection limiting device having an intermediate member carrying a plunger slidable therein and projecting therefrom, a housing in which said intermediate member is slidable, stop means on said intermediate member to limit the axial movement of the plunger relative to said intermediate member, first spring means for depressably holding said plunger off said stop means by a predetermined amount, second spring means for urging said intermediate member towards the side of said contact member remote from said timing belt so as to cause the projecting end of said plunger to contact the back of the contact member, said first spring means being of greater stiffness than said second spring means, and locking means operable to prevent axial movement of said intermediate member relative to said housing in a direction away from said contact member.

References Cited

UNITED STATES PATENTS

| 1,988,421 | 1/1935 | McCann et al. | 74—242.11 |
| 2,191,946 | 2/1940 | Weller | 74—242.11 |
| 3,117,463 | 1/1964 | Brindle | 74—242.11 |

FOREIGN PATENTS

| 688,348 | 5/1930 | France. |
| 1,013,876 | 12/1965 | Great Britain. |

OTHER REFERENCES

Winklhofer, German application 1,182,009, printed Nov. 19, 1964.

FRED C. MATTERN JR., *Primary Examiner.*

J. A. WONG, *Assistant Examiner.*